United States Patent

Takigawa et al.

[11] Patent Number: 6,130,496
[45] Date of Patent: Oct. 10, 2000

[54] STATOR COIL FOR ROTARY ELECTRIC MACHINE

[75] Inventors: Hideki Takigawa; Wataru Bitou; Makoto Tsukiji; Hiroki Shiota; Shiro Takada; Nobuo Urakawa, all of Tokyo, Japan

[73] Assignee: Mitsubishi Denki Kabushiki Kaisha, Tokyo, Japan

[21] Appl. No.: 09/355,245

[22] PCT Filed: Dec. 18, 1997

[86] PCT No.: PCT/JP97/04668

§ 371 Date: Jul. 27, 1999

§ 102(e) Date: Jul. 27, 1999

[87] PCT Pub. No.: WO99/31782

PCT Pub. Date: Jun. 24, 1999

[51] Int. Cl.[7] .............................. H02K 3/34; H02K 3/40
[52] U.S. Cl. ........................ 310/196; 310/45; 310/215
[58] Field of Search .......................... 310/43, 45, 195, 310/196, 215, 254; 174/120 R, 120 SC, 127, 138 E; 428/36, 102, 284, 324

[56] References Cited

U.S. PATENT DOCUMENTS

| | | | |
|---|---|---|---|
| 3,679,925 | 7/1972 | Fort | 310/196 |
| 4,533,580 | 8/1985 | Otty | 428/34.2 |
| 4,760,296 | 7/1988 | Johnston et al. | 310/45 |
| 5,030,870 | 7/1991 | Wichmann | 310/215 |
| 5,066,881 | 11/1991 | Elton et al. | 310/213 |
| 5,319,276 | 6/1994 | Schuler | 310/196 |
| 5,574,325 | 11/1996 | Musil et al. | 310/215 |

*Primary Examiner*—Nick Ponomarenko
*Assistant Examiner*—Tran N Nguyen
*Attorney, Agent, or Firm*—Leydig, Voit & Mayer, Ltd.

[57] ABSTRACT

A stator coil for a rotating electrical machine having a ground wall insulation of a stator coil impregnated with a resin, maintaining a releasing characteristic between the ground wall insulation and a slot of a stator core, preventing surface corona and exhibiting excellent characteristics for a long time. The stator coil of the rotating electrical machine has a conductor covered with an insulating layer and a surface-corona preventive layer, the stator coil being accommodated in the slot of a stator core and, together with the stator core, impregnated with a thermosetting resin so that the stator coil is integrated with the stator core. The surface-corona preventive layer has a wound semiconductive tape and a composite tape including a fluorine-containing non-bonding material layer on a second semiconductive tape. The slot of a stator core and the insulating layer contact the semiconductive tapes and the non-bonding material is disposed between the semiconductive tapes, forming a gap in a widthwise direction of the non-bonding material layer.

18 Claims, 5 Drawing Sheets

STATOR COIL FOR ROTARY ELECTRIC MACHINE

TECHNICAL FIELD

The present invention relates to a stator coil for an electric rotating machine which is manufactured by a global impregnation method with which a stator coil accommodated in a slot of stator core is impregnated with resin which is then cured.

BACKGROUND ART

In general, methods of manufacturing a stator coil for an electric rotating machine are sorted as a individual impregnation method and a global impregnation method. The individual impregnation method includes the steps of impregnating only a stator coil; heating and curing the resin in a heated press; and joining the stator coil with a slot of stator core; and winding wire. The global impregnation method includes the steps of joining a stator coil, which is not impregnated with the resin, to a slot of stator core; winding wire; and impregnating with the resin which is then cured. The global impregnation method causes the stator coil and the stator core to be strongly secured to each other. Therefore, the overall body of the winding has great mechanical rigidity, causing the thermal resistance between the stator coil and the stator core to be reduced as compared with that realized with the individual impregnation method. As a result, a rise in the temperature of the stator coil caused from heat produced from a conductor within stator coil during the operation can efficiently be prevented as compared with the individual impregnation method. If the stator coil is manufactured by the global impregnation method, an advantage can be realized in that the manufacturing process can be shortened because only one execution of each of the impregnation and curing processes is required.

On the other hand, size reduction and large capacity of the electric rotating machine, which is manufactured by the global impregnation method, have caused the current density of the conductor of the stator coil to be raised. Thus, the heating value of the conductor within stator coil is increased. In general, when an electric rotating machine rotates, heat generated in the conductor within stator coil serving as a driving force causes shearing stress to occur between the surface of the stator coil and the slot of stator core owing to the difference in the coefficients of thermal expansion. Therefore, the heating of the conductor within stator coil is increased, causing the shearing force to be enlarged. Thus, there arises a problem in that defects, such as separation and cracks, occur in ground wall insulation of stator coil.

On the other hand, as a method for shear stress relaxation occurring in the ground wall insulation of a stator coil, a contrivance has been disclosed by the applicant of the present invention in Japanese Patent Application No. 8-120222, in which an non-adhesive tape is wound around the outer surface of the ground wall insulation of the stator coil.

FIG. 9 is a diagram showing the conventional stator coil, in which an outlet portion of the slot is illustrated, which is included in a structure in which the stator coil is employed in a high-voltage electric rotating machine. Referring to the drawing, reference numeral 1 represents a stator core, 13 represents a stator coil, 13a represents an upper coil, 13b represents a lower coil, 3 represents a conductor within the stator coil, 4 represents a ground wall insulation of the stator coil, 5 represents a wedge, 6 represents an insulating spacer between upper and lower coil, 7 represents a slot of stator core, 8 represents a conductive-and-non-adhesive tape, and 9 represents a semiconductive tape.

FIG. 10 is a diagram showing a portion of the conductive-and-non-adhesive tape 8 in the lengthwise direction. One of the surfaces of the conductive-and-non-adhesive tape 8 is subjected to a surface treatment by corona discharge. FIG. 11 is a diagram showing a state of accommodation in which the conventional stator coil has been accommodated in the slot of stator core 7.

That is, a mica tape is wound around the conductor 3 within stator coil several times so that the insulating layer 4 of the stator coil is formed. Then, a conductive-and-non-adhesive tape 8 (see FIG. 10) having one side subjected to the surface treatment by corona discharge is obtained. The conductive-and-non-adhesive tape 8 is half lap wound around the surface of the ground wall insulation the stator coil such that a surface 14 of the conductive-and-non-adhesive tape 8 subjected to the corona faces the insulating layer 4 of the stator coil to the ground. Then, the semiconductive tape 9 is half lap wound around the conductive-and-non-adhesive tape 8.

The stator coil 13 is inserted into the slot of stator core 7, and then the wedge 5 is driven to secure the stator coil 13. Then, the stator coils 13 are electrically and mechanically connected to one another by connection between coils. Then, impregnation and hardening of the resin are performed.

The surface of the conductive-and-non-adhesive tape 8 subjected to the conductive-and-non-adhesive tape 8 and the surface of the insulating layer 4 of the stator coil to the ground are strongly bonded to each other by the impregnation resin. Another surface of the conductive-and-non-adhesive tape 8 which is not subjected to the surface treatment by corona discharge and the semiconductive tape 9 are separated from each other if a shearing force of adequate magnitude is exerted.

Therefore, the shearing force produced between the insulating layer 4 of the stator coil to the ground and the slot of stator core 7 can be moderated because the semiconductive tape 9 and the conductive-and-non-adhesive tape 8 are separated from each other. As a result, no shearing force is exerted on the insulating layer 4 of the stator coil to the ground. As a result, separation and cracks in the insulating layer 4 of the stator coil to the ground can be prevented.

Since the conductive-and-non-adhesive tape 8 establishes the electrical connection between an stator core 1 and the stator coil 13, production of a surface corona can be prevented.

However, the foregoing stator coil of the electric rotating machine incorporates a conductive-and-non-adhesive tape 8 constituted by a fluorine-containing film. The film has poor wettability with respect to the impregnation resin. As shown in FIG. 11, lapped portions of the films encounter a sealing effect owning to close contact between the films. As a result, the impregnation characteristic of the impregnation resin with respect to the insulating layer 4 of the stator coil deteriorates. Therefore, portions which are not impregnated with the resin are easily formed in the insulating layer 4 of the stator coil. As a result, there is apprehension that the mechanical strength and the electric characteristics of the stator coil deteriorate.

To solve the above mentioned problem, an object of the present invention is to obtain a stator coil for a electric rotating machine, which does not deteriorate the impregnation characteristic of the resin with respect to the ground wall insulation of stator coil, which is able to prevent generation of a surface corona while a smooth releasing characteristic is being maintained, which is able to prevent occurrence of a surface corona and which is able to maintain excellent characteristics for a long time.

SUMMARY OF THE INVENTION

A stator coil for an electric rotating machine according to a first aspect of the present invention comprises: a ground wall insulation of stator coil for covering a conductor; and a surface-corona preventive layer for covering the ground wall insulation of stator coil and structured by accommodating the stator coil for an electric rotating machine in a slot of stator core and by, together with the stator core, impregnated with thermosetting resin so as to be cured so that the stator coil is integrated with the stator core by the cured resin, wherein the surface-corona preventive layer is formed by winding a semiconductive tape and a composite tape, which has a fluorine non-bonding material layer formed on either side of a semiconductive tape and which has a width smaller than the semiconductive tape, such that the slot of stator core and the insulating layer to the ground are in contact with a semiconductive surface of the tape and the non-bonding material layer is disposed between the semiconductive tape portions so as to form a gap in a widthwise direction of the non-bonding material layer. Thus, an impregnation characteristic of the resin with respect to the ground wall insulation of stator coil does not deteriorate, a releasing characteristic between the ground wall insulation of stator coil and the slot of stator core can be maintained, occurrence of surface corona can be prevented and excellent characteristics can be maintained for a long time.

A stator coil for an electric rotating machine according to a second aspect of the present invention has a structure according to the first aspect, wherein the insulating layer to the ground is formed by winding a semiconductive tape.

A stator coil for an electric rotating machine according to a third aspect of the present invention has a structure according to the first aspect, wherein the insulating layer to the ground is formed by winding a composite tape. Thus, the workability can be improved.

A stator coil for an electric rotating machine according to a fourth aspect comprises: an insulating layer to the ground for covering a conductor; and a surface-corona preventive layer for covering the insulating layer to the ground and structured by accommodating the stator coil for a electric rotating machine in a slot of stator core and together with the stator core, impregnated with thermosetting resin cured so that the stator coil is integrated with the stator core by the cured resin, wherein the surface-corona preventive layer is formed by winding a composite tape, which has a fluorine-containg non-bonding material layer formed on either side of a semiconductive tape and which has a width smaller than the semiconductive tape, such that the slot of stator core and the insulating layer to the ground are in contact with a surface of the semiconductive tape and the non-bonding material layer is disposed between the semiconductive tape portions so as to form a gap in a widthwise direction of the non-bonding material layer. Thus, an impregnation characteristic of the resin with respect to the ground wall insulation of stator coil does not deteriorate, a releasing characteristic between the ground wall insulation of stator coil and the slot of stator core can be maintained, occurrence of surface corona can be prevented and excellent characteristics can be maintained for a long time.

A stator coil for an electric rotating machine according to a fifth aspect of the present invention has a structure according to the first aspect, wherein the semiconductive tape has a width smaller than that of the the composite tape. Thus, the impregnation characteristic of the resin with respect to the ground wall insulation of stator coil can furthermore be improved.

A stator coil for an electric rotating machine according to a sixth aspect of the present invention has a structure according to the first aspect, wherein a semiconductive tape having a width smaller than that of the composite tape is wound between the insulating layer to the ground or the slot of stator core and the wound composite tape. As a result, the electrical connection with the ground wall insulation of stator coil or the slot of stator core can reliably be established.

A stator coil for an electric rotating machine according to a seventh aspect of the present invention has a structure according to the fifth or the sixth aspect, wherein a semiconductive tape having a width smaller than that of the composite tape is wound such that portions of the semiconductive tape are abutted against each other. As a result, the electrical connection with the ground wall insulation of stator coil or the slot of stator core can furthermore reliably be established.

A stator coil for an electric rotating machine according to an eighth aspect of the present invention has a structure according to the first or fourth aspect, wherein the semiconductive tape is made of woven cloth or nonwoven cloth. As a result, the impregnation characteristic can be improved.

A stator coil for an electric rotating machine according to a ninth aspect of the present invention has a structure according to the first or fourth aspect wherein the non-bonding material is a conductive material. As a result, the electrical connection between the ground wall insulation of stator coil and the slot of stator core can simply be established.

A stator coil for an electric rotating machine according to a tenth aspect of the present invention has a structure according to the first or fourth aspect wherein the non-bonding material is an insulating material. As a result, an excellent releasing characteristic can be realized.

A stator coil for an electric rotating machine according to an eleventh aspect of the present invention has a structure according to the first or fourth aspect, wherein the non-bonding material is composed of a conductive-and-non-bonding material and an insulating-and-non-bonding material. As a result, the electrical connection between the ground wall insulation of stator coil and the slot of stator core can simply be established. Moreover, an excellent releasing characteristic can be realized.

A stator coil for a electric rotating machine according to a twelfth aspect of the present invention has a structure according to the tenth or the eleventh aspect, wherein the insulating-and-nonbonding material is PTFE, PFA, ETFE or PVDF. As a result, an excellent releasing characteristic can be realized.

BEST MODE FOR CARRYING OUT THE INVENTION

Figure 1:
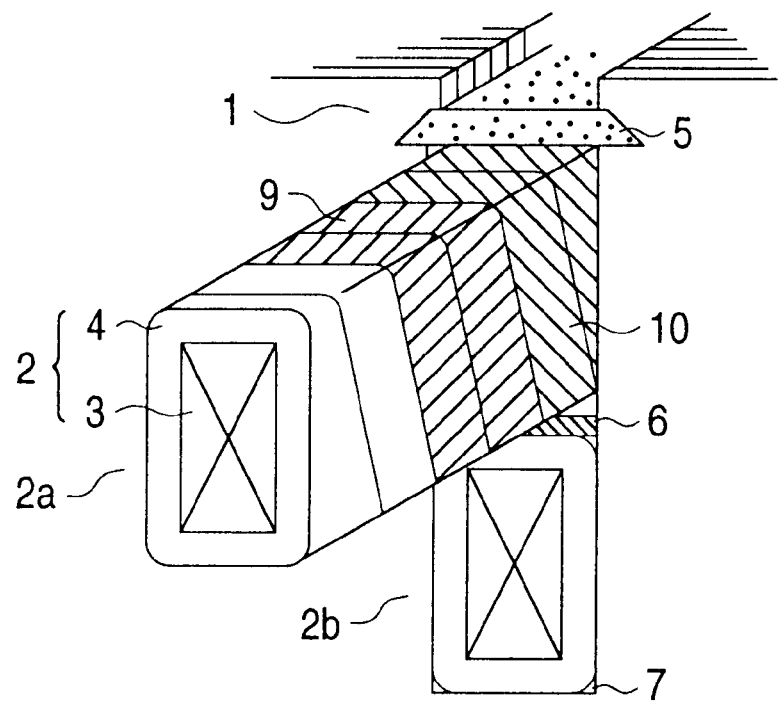
FIG. 1 is a diagram showing the structure of the outlet portion of a slot of a high-voltage electric rotating machine to which a stator coil according to an embodiment of the present invention is applied.

FIG. 1 is a diagram showing the structure of the outlet portion of a slot of a high-voltage electric rotating machine to describe a stator coil according to an embodiment of the present invention. Referring to the drawing, reference numeral 2 represents the stator coil of the electric rotating machine according to the embodiment of the present invention. Referring to FIG. 1, reference numeral 1 represents a stator core formed by laminating silicon steel plate, 3 represents a conductor within stator coil, 4 represents a ground wall insulation of the stator coil, 5 represents a wedge, 6 represents an insulating spacer between upper and lower coil, 7 represents a slot of stator core, 9 represents a semiconductive tape and 10 represents a composite tape.

The stator coil 2 of an electric rotating machine according to the embodiment of the present invention incorporates a conductor 3 within stator coil 2, an insulating layer 4 of the stator coil formed by winding a mica tape around the conductor 3 within stator coil 2 and a surface-corona preventive layer disposed on the outside of the insulating layer 4 of the stator coil and preventing corona discharge with respect to the slot 7 of stator core 1. The surface-corona preventive layer is composed of a wound semiconductive tape 9 which has a semiconductive characteristic and a wound composite tape 10 to be described later.

The stator coil 2 is accommodated in the slot 7 of stator core 1 and impregnated with thermosetting impregnation resin together with the stator core 1. Thus, the stator coil 2 is integrated in the stator core 1 by the cured resin.

Figure 2:
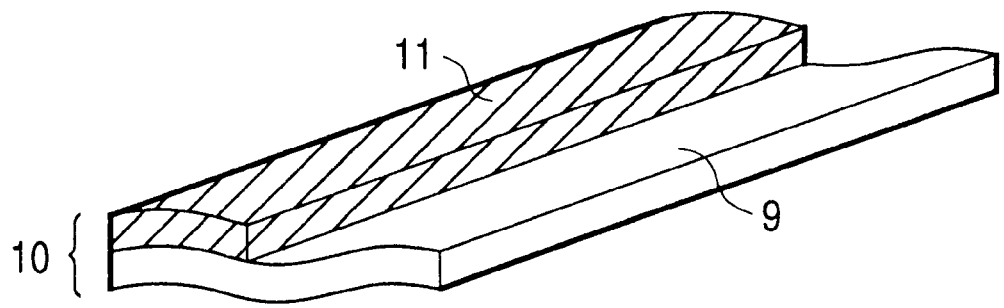
FIG. 2 is a diagram showing a composite tape according to the present invention.

FIG. 2 is a diagram showing the composite tape 10 of the surface-corona preventive layer according to the present invention. A portion of the composite tape 10 in the lengthwise direction is illustrated. Reference numeral 11 represents an non-bonding material layer 11. The composite tape 10 has an non-bonding material layer 11 constituted by an applied non-bonding film which has a width smaller than the width of the semiconductive tape 9, for example, a width smaller than half of the width of the semiconductive tape 9. Winding of the composite tape 10 must be performed as follows.

That is, winding is performed such that the slot of stator core 7 or the insulating layer 4 of the stator coil to the ground is made contact with a semiconductive surface of the foregoing tape. Moreover, at least one semiconductive tape layer exists among the stator core 1, the insulating layer 4 of the stator coil to the ground and the slot of stator core 7. Thus, the overall surfaces of the semiconductive tape 9 and the unbonding material layer 11 of the composite tape 10 can easily be released from each other. As a result, shearing stress which is, during the operation, generated between the slot of stator core and the ground wall insulation of stator coil can effectively be moderated. Hence, occurrence of separation and cracks in the ground wall insulation of stator coil can be prevented.

Moreover, winding is performed such that gaps are formed in the widthwise direction of the unbonding material layer 11 so that the unbonding material layer is wound with periodical clearances. As a result, passages for impregnation resin into the insulating layer 4 of the stator coil to the ground can be formed. Therefore, impregnation of the resin into the insulating layer 4 of the stator coil to the ground can easily be performed.

When the surface-corona preventive layer is provided for the outer surface of the insulating layer 4 of the stator coil to the ground by winding the semiconductive tape 9 and the composite tape 10, winding of the semiconductive tape 9 is initially performed. Then, winding of the composite tape 10 is performed. A retrograde order may be employed, or both of the tapes may be the composite tapes. It is essential that the slot of stator core 7 and the insulating layer 4 to the ground are made contact with the semiconductive surface of the foregoing tape.

If the width of the semiconductive tape is smaller than that of the semiconductive tape of the composite tape, the number of gaps per unit length can be enlarged as compared with a structure in which only the semiconductive tape is used. As a result, impregnation can furthermore easily be performed.

If a semiconductive tape having a width smaller than the width of the semiconductive tape of the composite tape is wound between the insulating layer 4 of the stator coil to the ground or the slot of stator core 7 and the composite tape 10, the electrical connection between the insulating layer 4 of the stator coil to the ground and the slot of stator core 7 can reliably be established.

When abutting of portions of a semiconductive tape having a width smaller than that of the semiconductive tape 9 of the composite tape 10, is employed, the electrical connection between the insulating layer 4 of the stator coil to the ground and the slot of stator core 7 can reliably be established.

When the semiconductive tape 9 is made of semiconductive woven cloth or nonwoven cloth, both conductivity and impregnation characteristic can be realized.

When the unbonding material layer 11 of the composite tape 10 are made of conductive materials, satisfactory workability can be realized. Moreover, the electrical connection can reliably be established.

As the insulating-and-unbonding material of the composite tape 10, for example, any one of the foregoing materials is employed: PTFE (polytetrafluoroethylene), ETFE (ethylenetetrafluoroethylene copolymer), PFA (tetrafluoroethyleneperfluoroalkylvinylidene copolymer) or PVDF (polyvinylidene fluoride). In particular, PTFE has an excellent releasing characteristic.

When the non-bonding material layer 11 of the composite tape 10 is arranged such that a conductive-and-non-bonding material and an insulating-and-non-bonding material are disposed alternately, the non-bonding material layer 11 is composed of the conductive-and-non-bonding material and the insulating-and-non-bonding material. In the foregoing case, an excellent releasing characteristic and workability can be realized. Therefore, the electrical connection can simply be established.

Specific embodiments will now be described.

First Embodiment

Figure 3:
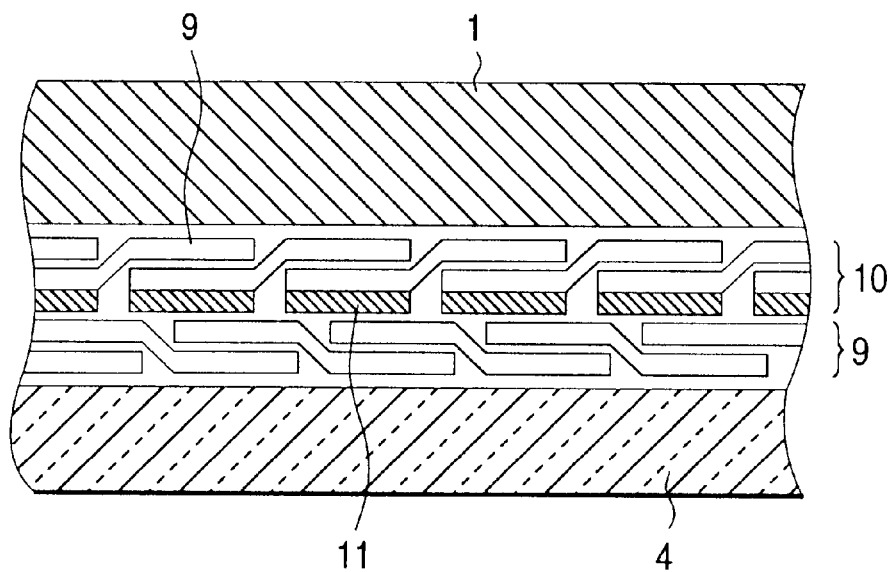
FIG. 3 is a diagram showing a state in which a stator coil according to a first embodiment of the present invention has been accommodated in a slot of stator core.

FIG. 3 is a diagram showing a state of accommodation of a coil according to a first embodiment of the present invention accommodated in the slot of a stator core.

As shown in FIG. 3, the stator coil has a mica tape wound around a conductor within stator coil several times so that the insulating layer 4 of the stator coil is formed. Then, the semiconductive tape 9 is wound around the insulating layer 4 of the stator coil such that half lapped taping is performed. Then, the composite tape 10 is wound around the semiconductive tape 9 such that a gap is formed in the widthwise direction of the non-bonding material layer 11 of the composite tape 10. Therefore, a surface of the wound composite tape 10 is apparently realized such that the non-bonding material is solely wound with periodic clearances.

Since the passages for the impregnation resin can be provided for the composite tape 10, the impregnation characteristic of resin with respect to the insulating layer 4 of the stator coil to the ground can be improved.

When semiconductive woven cloth or nonwoven cloth is employed as the semiconductive tape 9, a satisfactory result can be obtained in that the impregnation characteristic of the resin with respect to the insulating layer 4 of the stator coil to the ground does not deteriorate.

When the non-bonding material of the composite tape 10 is tetrafluoroethylene (PTFE), an excellent releasing characteristic with respect to the impregnation resin can be obtained as compared with other fluorine-containing fluoride film materials. In the foregoing case, shearing stress is generated between the slot of stator core and the surface of the stator coil when curing and cooling processes are performed and when it is started/stopped in service. The shearing stress causes the semiconductive tape 9 and the non-bonding material layer 11 of the composite tape 10 to easily be released from each other. As a result, separation and cracks in the insulating layer 4 of the stator coil to the ground can be prevented.

Note that the tetrafluoroethylene is a material having an insulating characteristic. Therefore, the electrical connection is established between the surface of the insulating layer 4 of the stator coil and that of the slot of stator core as follows: the non-bonding material layer 11 of the composite tape 10 is removed in a predetermined region in the central portion in the lengthwise direction of the slot of stator core. Then, the semiconductive tape 9 of the composite tape 10 wound around the surface of the insulating layer 4 of the stator coil and the slot are electrically connected to each other. As a result of the foregoing process, occurrence of a surface corona can be prevented.

A fluorine-containing film, such as conductive PFA, ETFE or PVDF, may be employed as the non-bonding material layer 11 of the composite tape 10. In the foregoing case, the non-bonding material layer 11 has electrical conductivity. Therefore, the process for removing the non-bonding material layer 11 of the composite tape 10 from the predetermined region in the central portion in the lengthwise direction of the slot of stator core is not required. As a result, workability can be improved.

When the insulating-and-non-bonding material and the conductive-and-non-bonding material are provided for the semiconductive tape as the non-bonding material layer 11 of the composite tape 10, conductivity can be realized with satisfactory workability while an excellent releasing characteristic is being maintained.

Second Embodiment

Figure 4:
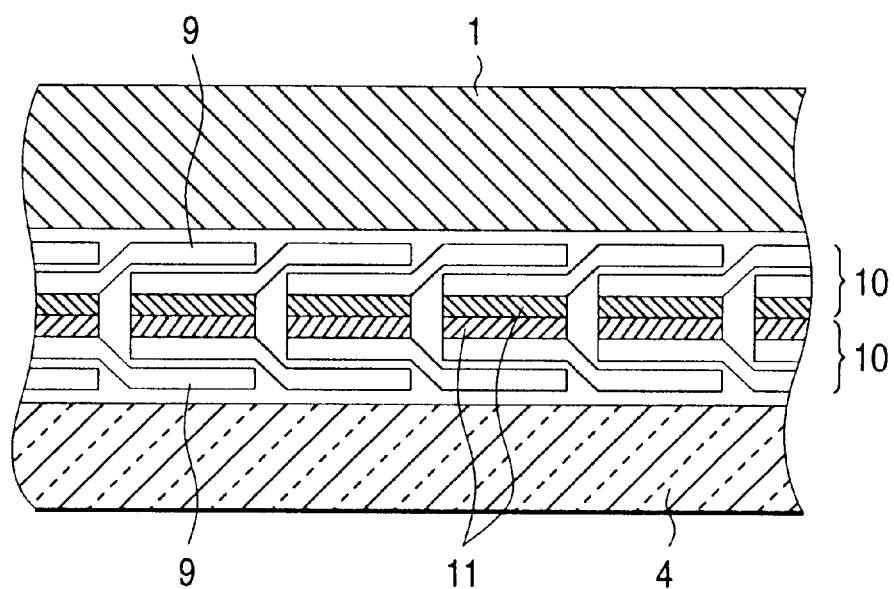
FIG. 4 is a diagram showing a state in which a stator coil according to a second embodiment of the present invention has been accommodated in the slot of stator core.

FIG. 4 is a diagram showing a state in which a stator coil according to a second embodiment of the present invention has been accommodated in the slot of stator core.

As shown in FIG. 4, the stator coil has the following structure: a mica tape is wound around the conductor within stator coil several times so that the insulating layer 4 of the stator coil to the ground is formed. Then, the composite tape 10 is wound around the insulating layer 4 of the stator coil to the ground such that the non-bonding material layer 11 is disposed opposite to the slot of stator core. Moreover, the non-bonding material layer 11 is wound such that gaps are formed in the widthwise direction. Then, another composite tape 10 is wound such that the non-bonding material layer 11 is disposed opposite to the insulating layer 4 of the stator coil to the ground. Moreover, the portions of the non-bonding material layer 11 are disposed opposite to each other (the portions are overlapped).

The directions in which the two composite tapes 10 are wound are opposite directions. As a result, the passages for the resin formed by the wound non-bonding material layer 11, which has been wound first, are not closed by the non-bonding material layer 11 which is wound above the non-bonding material layer 11. Therefore, passages for the impregnation resin to the insulating layer 4 of the stator coil to the ground can be maintained.

Since the non-bonding material layer 11 is positioned opposite to the two composite tapes 10, the releasing characteristic can be significantly improved.

As a matter of course, slipping occurs between the opposite non-bonding material layers facing the two wound composite tapes. Therefore, slipping must be prevented by using an adhesive tape or the like whenever the composite tape is wound for an appropriate length.

As for the composite tape 10, a tape similar to that according to the first embodiment may be employed.

Third Embodiment

Figure 5:
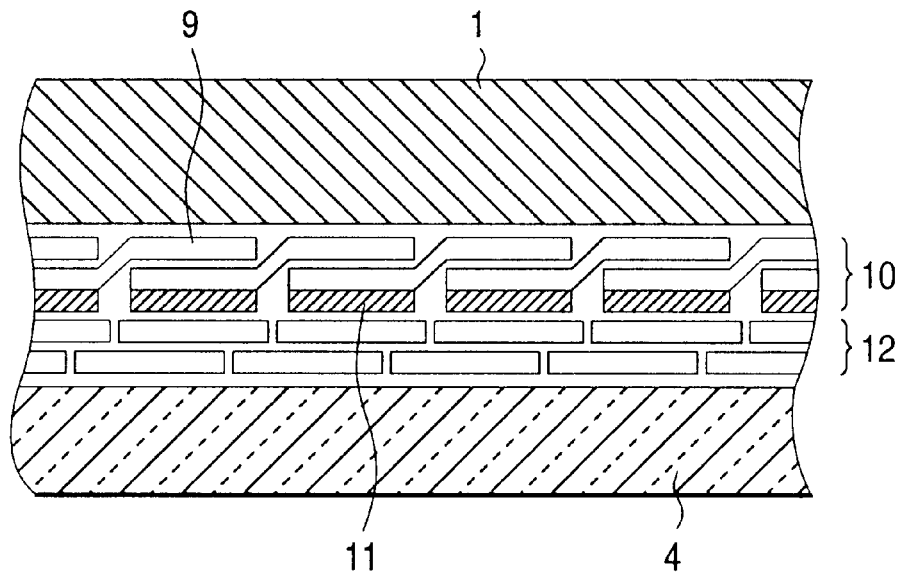
FIG. 5 is a diagram showing a state in which a stator coil according to a third embodiment of the present invention has been accommodated in the slot of stator core.

FIG. 5 is a diagram showing a state in which a stator coil according to the third embodiment has been accommodated in the slot of stator core.

As shown in FIG. 5, the stator coil has a winding structure similar to the that of the first embodiment. Note that a semiconductive tape 12 having a width smaller than that of the semiconductive tape of the composite tape 10 is substituted for the semiconductive tape 9 according to the first embodiment. The semiconductive tape 12 is wound such that portions of the semiconductive tape 12 are abutted against each other two times.

Since the narrow semiconductive tape 12 is abutted and wound two times, the electrical connection with the surface of the insulating layer 4 of the stator coil to the ground can reliably be established. As compared with the first embodiment in which half portions of the semiconductive tape 9 are overlapped, the impregnation passages formed along the surface of semiconductive tape can be shortened. As a result, the impregnation characteristic can be improved.

As the composite tape 10, a tape similar to that according to the first embodiment may be employed.

Fourth Embodiment

Figure 6:
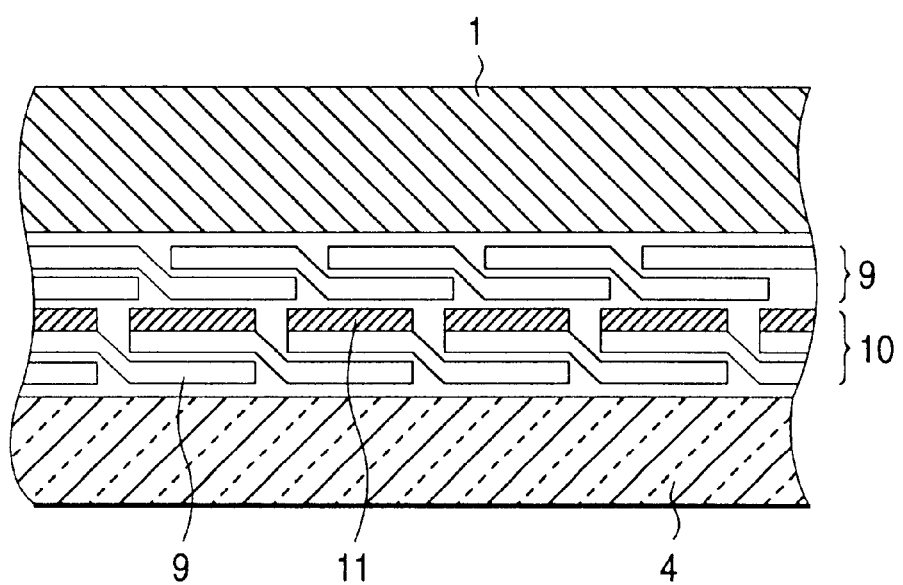
FIG. 6 is a diagram showing a state in which a stator coil according to a fourth embodiment of the present invention has been accommodated in the slot of stator core.

FIG. 6 is a diagram showing a state in which a stator coil according to a fourth embodiment of the present invention has been accommodated in the slot of stator core.

As shown in FIG. 6, the stator coil has the following structure: the mica tape is wound around the conductor within stator coil several times so that the insulating layer 4 of the stator coil is formed. Then, the composite tape 10 is wound around the insulating layer 4 of the stator coil such that the non-bonding material layer 11 is disposed opposite to the slot of stator core. Moreover, the composite tape 10 is wound such that gaps in the widthwise direction of the non-bonding material layer 11 of the composite tape 10 are formed while overlapping is prevented. Then, the semiconductive tape 9 is wound around the composite tape 10 such that the portions of the semiconductive tape 9 are overlapped.

As a result of the winding process, the non-bonding material layer 11 is exposed over the surface when the composite tape 10 is wound. As a result, workability of the winding operation can be improved.

As the composite tape 10, a tape similar to that according to the first embodiment may be employed.

Fifth Embodiment

Figure 7:
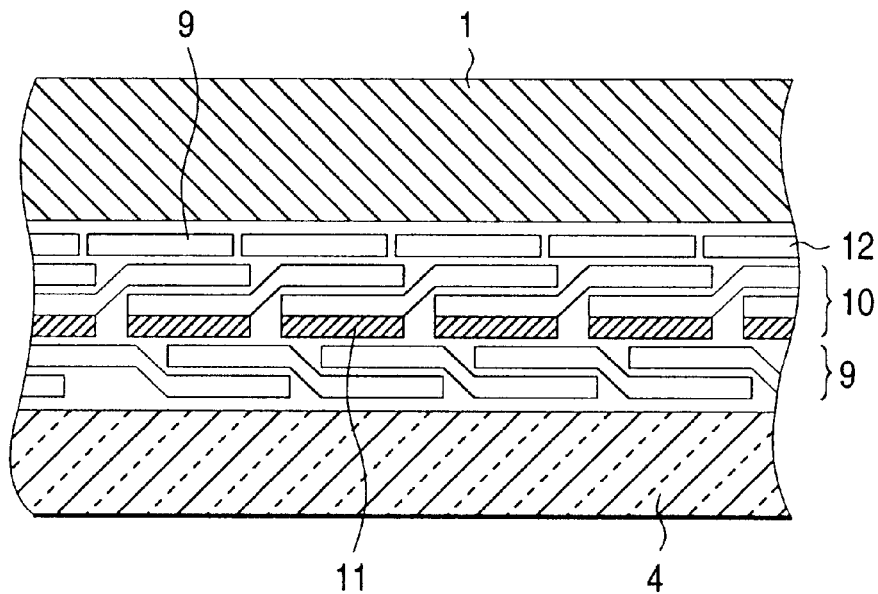
FIG. 7 is a diagram showing a state in which a stator coil according to a fifth embodiment of the present invention has been accommodated in the slot of stator core.

FIG. 7 is a diagram showing a state in which a stator coil according to a fifth embodiment of the present invention has been accommodated in the slot of stator core.

As shown in FIG. 7, the stator coil has a structure according to the first embodiment in which the semiconductive tape 9 and the composite tape 10 are wound. Moreover, the structure according to the third embodiment in which the portions of the semiconductive tape 12 having a small width are abutted against each other is added to the above-mentioned structure.

Since winding of the semiconductive tape 12 having the small width is added, the electrical connection between the composite tape 10 and the slot of stator core can reliably be established. Therefore, deterioration in the impregnation characteristic caused by an increase in the semiconductive tape layers can be minimized.

As the composite tape 10, a tape similar to that according to the first embodiment may be employed.

Sixth Embodiment

Figure 8:
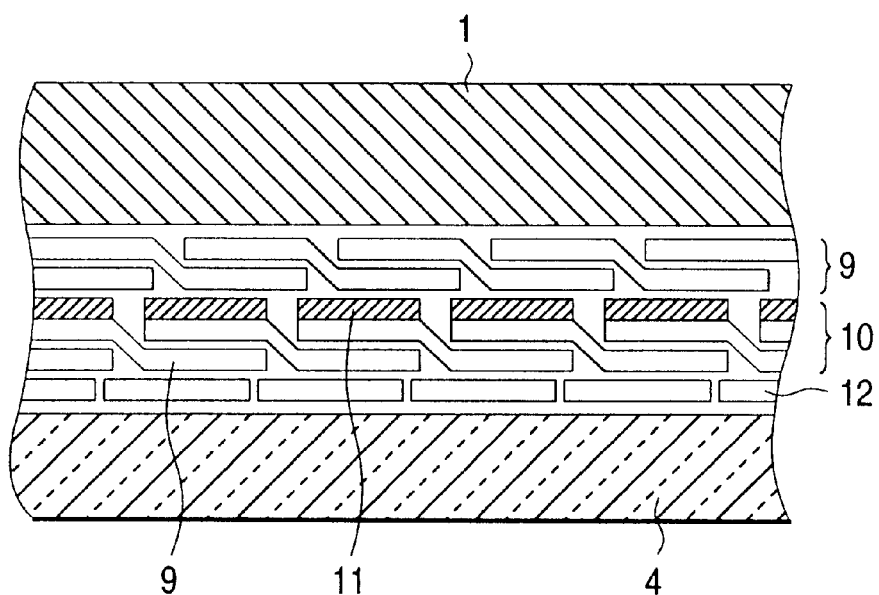
FIG. 8 is a diagram showing a state in which a stator coil according to a sixth embodiment of the present invention has been accommodated in the slot of stator core.
Figure 9:
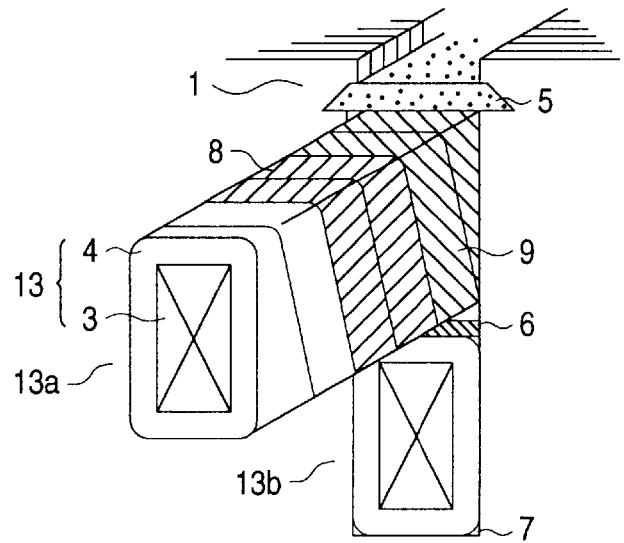
FIG. 9 is a diagram showing a conventional stator coil.
Figure 10:
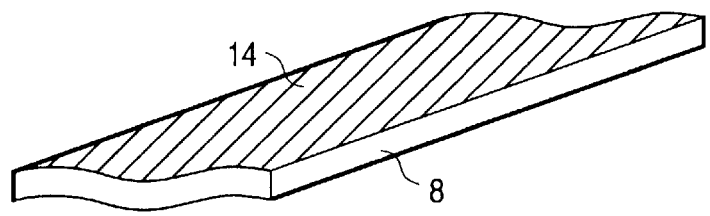
FIG. 10 is a diagram showing a conventional conductive and non-adhesive tape.
Figure 11:
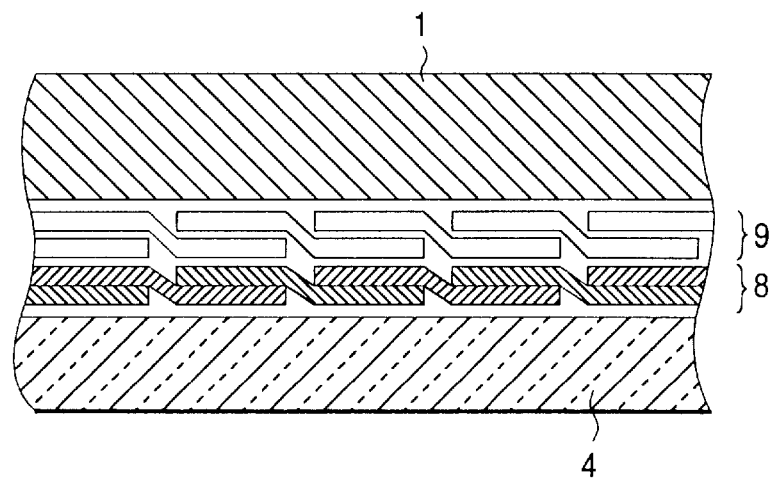
FIG. 11 is a diagram showing a conventional stator coil 13 accommodated in a slot of stator core is accommodated.

FIG. 8 is a diagram showing a state in which a stator coil according to a sixth embodiment of the present invention has been accommodated in the slot of stator core.

As shown in FIG. 8, the stator coil has a structure in which the semiconductive tape 12 having the small width and according to the third embodiment is initially wound such that the semiconductive tape 12 is abutted against the outer end of the insulating layer 4 of the stator coil. Then, the composite tape 10 and the semiconductive tape 9 are wound around the insulating layer 4 of the stator coil similar to the fourth embodiment.

Since winding of the semiconductive tape 12 having the small width is added, the electrical connection between the composite tape 10 and the insulating layer 4 of the stator coil can reliably be established. Therefore, deterioration in the impregnation characteristic caused by an increase in the semiconductive tape layers can be minimized.

As the composite tape 10, the tape according to the first embodiment may be employed.

Industrial Applicability

The present invention may be applied to a generator, a stator coil of a high-voltage electric rotating machine to a large-size motor and a large-size coil, such as a coil for a nuclear fusion reactor. The problem of dielectric breakdown caused from a thermal load generated because of use with large capacity can be solved. As a result, reliably can be improved.

What is claimed is:

1. A stator coil for a rotating electrical machine comprising:
   a stator core having a slot;
   a stator coil disposed in the slot, including a conductor and a ground wall insulation covering the conductor; and
   a surface-corona preventive layer covering the ground wall insulation of said stator coil and impregnated with a thermosetting resin so that said stator coil is integrated with said stator core by the resin, wherein said surface-corona preventive layer includes a first semiconductive tape and a composite tape, said composite tape comprising a second semiconductive tape and a fluorine-containing non-bonding material layer on one side of said second semiconductive tape, said fluorine-containing non-bonding material layer being narrower than said second semiconductive tape, said first semiconductive tape and said composite tape being sequentially wound on said ground wall insulation such that said stator core, at the slot, and said ground wall insulation respectively contact said second and first semiconductive tapes and said fluorine-containing non-bonding material layer is disposed between said first and second semiconductive tapes, with a gap between adjacent windings of said fluorine-containing non-bonding material layer.

2. The stator coil for a rotating electrical machine according to claim 1, wherein said first semi-conductive tape is narrower than said second semiconductive tape.

3. The stator coil for a rotating electrical machine according to claim 2, including a third semiconductive tape narrower than said second semiconductive tape, wound such that portions of said third semiconductive tape are abutted against each other.

4. The stator coil for a rotating electrical machine according to claim 1, including a third semiconductive tape narrower than said second semiconductive tape and wound between said ground wall insulation and said composite tape.

5. The stator coil for a rotating electrical machine according to claim 1, wherein said first and second semiconductive tapes are cloth.

6. The stator coil for a rotating electrical machine according to claim 1, wherein said fluorine-containing non-bonding material layer is a conductive material.

7. The stator coil for a rotating electrical machine according to claim 1, wherein said fluorine-containing non-bonding material layer is an insulating material.

8. The stator coil for a rotating electrical machine according to claim 7, wherein the insulating material is selected from the group comprising polytetrafluoroethylene, tetrafluoroethylene-perfluoroalkylvinylidene copolymer, ethylene-tetrafluoroethylene copolymer, and polyvinylidene fluoride.

9. The stator coil for a rotating electrical machine according to claim 1, wherein said fluorine-containing non-bonding material layer includes a conductive-and-non-bonding material and an insulating-and-non-bonding material.

10. The stator coil for a rotating electrical machine according to claim 9, wherein the insulating and non-bonding material is selected from the group comprising polytetrafluoroethylene, tetrafluoroethylene-perfluoroalkylvinylidene copolymer, ethylene-tetrafluoroethylene copolymer, and polyvinylidene fluoride.

11. The stator coil for a rotating electrical machine according to claim 1, including a third semiconductive tape narrower than said second semiconductive tape and wound between the slot of said stator core and said composite tape.

12. A stator coil for a rotating electrical machine comprising:

a stator core having a slot;

a stator coil in the slot, including a conductor and a ground wall insulation covering the conductor; and a surface-corona preventive layer covering the ground wall insulation of said stator coil and impregnated with thermosetting resin so that said stator coil is integrated with said stator core by the resin, wherein said surface-corona preventive layer includes first and second wound composite tapes, said first and second composite tapes respectively including first and second semiconductive tapes and first and second fluorine-containing non-bonding material layers located on first sides of said first and second semiconductive tapes, said first and second fluorine-containing non-bonding material layers being narrower than said first and second semiconductive tapes, said first and second composite tapes being sequentially wound on said ground wall insulation such that said first and second fluorine-containing non-bonding material layers are opposite each other and in contact, and said stator core, at the slot, and said ground wall insulation are, respectively, in contact with second sides of said first and second semiconductive tapes, and said first and second fluorine-containing non-bonding material layers are wound with a gap between adjacent windings of each of said first and second fluorine-containing non-bonding material layers.

13. The stator coil for a rotating electrical machine according to claim 12, wherein said first and second semiconductive tapes are cloth.

14. The stator coil for a rotating electrical machine according to claim 12, wherein said fluorine-containing non-bonding material layer is a conductive material.

15. The stator coil for a rotating electrical machine according to claim 12, wherein said fluorine-containing non-bonding material layer is an insulating material.

16. The stator coil for a rotating electrical machine according to claim 15, wherein the insulating material is selected from the group comprising polytetrafluoroethylene, tetrafluoroethylene-perfluoroalkylvinylidene copolymer, ethylene-tetrafluoroethylene copolymer, and polyvinylidene fluoride.

17. The stator coil for a rotating electrical machine according to claim 12, wherein said fluorine-containing non-bonding material layer includes a conductive-and-non-bonding material and an insulating-and-non-bonding material.

18. The stator coil for a rotating electrical machine according to claim 17, wherein the insulating and non-bonding material is selected from the group comprising polytetrafluoroethylene, tetrafluoroethylene-perfluoroalkylvinylidene copolymer, ethylene-tetrafluoroethylene copolymer, and polyvinylidene fluoride.

* * * * *